United States Patent
Tanaka et al.

(10) Patent No.: US 6,473,105 B1
(45) Date of Patent: Oct. 29, 2002

(54) OPTICAL SCANNING APPARATUS FOR PREVENTING COLOR MISREGISTRATION

(75) Inventors: Toshihito Tanaka, Saga (JP); Yukinori Hara, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/709,943

(22) Filed: Nov. 10, 2000

(30) Foreign Application Priority Data

Nov. 12, 1999 (JP) ............................................. 11-322603

(51) Int. Cl.$^7$ .......................... G03G 15/01; G02B 26/10
(52) U.S. Cl. ...................... 347/118; 347/232; 347/241; 347/243; 347/244; 359/204
(58) Field of Search ................................ 347/115, 116, 347/117, 118, 119, 232, 233, 241, 243, 244; 359/204, 206

(56) References Cited

U.S. PATENT DOCUMENTS 5,181,137 A * 1/1993 Koide ........................ 347/232
6,317,245 B1 * 11/2001 Hama et al. ................ 347/232

FOREIGN PATENT DOCUMENTS

JP 9-211925 8/1997

* cited by examiner

Primary Examiner—Joan Pendegrass
(74) Attorney, Agent, or Firm—RatnerPrestia

(57) ABSTRACT

An optical scanning apparatus is configured to comprise (a) a deflector for deflecting and scanning a plurality of bundled incident laser beams, (b) a conversion optical system for converting the bundle of laser beams moving at a constant angular velocity into a bundle of laser beams moving at a constant linear velocity, (c) reflection mirrors for separating the bundled laser beams into four corresponding to respective colors, (d) photosensitive members for forming respective electrostatic latent images by means of the laser beams corresponding to the respective colors, wherein one of the photosensitive members is disposed on a plane parallel to an area defined by the laser beams traveling between the deflector and the conversion optical system and (e) a correction optical system for correcting curvatures of field with respect to the respective laser beams and leading the laser beams to the photosensitive members.

3 Claims, 5 Drawing Sheets

OPTICAL SCANNING APPARATUS FOR PREVENTING COLOR MISREGISTRATION

FIELD OF THE INVENTION

The present invention relates to an optical scanning apparatus for use in a multicolor image forming apparatus such as a color copier, a color printer, a color facsimile or the like.

BACKGROUND OF THE INVENTION

Recently, a digital copier and a laser-beam printer are commercially practical as multicolor image forming apparatuses forming color images. Either of the apparatuses forms a color image in the following manner. Four photosensitive drums are disposed in a conveying direction of output paper. After these photosensitive drums are uniformly charged by respective chargers, they are simultaneously exposed to respective laser beams generated by respective optical scanning apparatuses, thereby forming four electrostatic latent images. These four electrostatic latent images are developed by respective development units using respective toners of different colors i.e., yellow, magenta, cyan and black, and successively transferred so as to overlap one another, thereby forming a color image.

As described above, such a tandem-type multicolor image forming apparatus generally uses individually positioned optical scanning apparatuses corresponding to respective colors, which are yellow, magenta, cyan and black. However, the individually positioned optical scanning apparatuses corresponding to the respective colors for formation of a color image are likely to cause color misregistration.

Causes of the color misregistration are as follows.

For example, in cases where polygon mirror scanner motors are used as light deflectors, even if rotational speed of the motors is controlled respectively based on a clock having the same frequency as those of the other motors, a deviance of printing width occurs because inertial weight, a coil winding state, rotator's balance and the like vary from motor to motor. Moreover, since in each of the optical scanning apparatuses installed is different optical system and different housing, incident laser beams for the respective colors bring about relative shifts to the rest such as printing inclination and scanning curvature. Furthermore, in cases where semiconductor lasers are used as beam generators, wavelength variation of each of the lasers resulting from atmospheric temperature variation takes place. For instance, in the event that black printing is performed first and successively four-color printing is performed, the wavelength of the semiconductor laser for black printing becomes different in the second printing due to an atmospheric temperature rise. As a result, a diffraction index of the laser for black differs from those of the lasers for the other three colors, thus causing color misregistration.

Conventionally, in order to solve the foregoing problems, a detector reads an actual print, and based on its detected result, a modification is made to a dot clock to correct a deviance of printing width. Moreover, an actuator is attached to a reflection mirror installed in each of the optical scanning apparatuses, and each reflection mirror is moved in accordance with the amount of color misregistration, thereby correcting relative scanning inclination and relative scanning curvature.

However, the aforementioned technique requires actual printing for every correction of color misregistration. In particular cases where such a correction is made with respect to the temperature rise within the apparatus, since actual printing is performed for every certain temperature rise, toner is consumed in large quantity, whereby the increases in running costs and in waste toner take place. Moreover, in the event that a waste toner box that is small in capacity is integrally formed with the development unit, it needs to be replaced together with the development unit before the lifetime of the development unit comes to an end. On the other hand, a sufficient capacity of the waste toner box with respect to the lifetime of the development unit entails upsizing of the multicolor image forming apparatus. Moreover, additional costs such as the cost of detector for measuring the color misregistration amount based on the actual print and the cost of actuators for moving the reflection mirrors of the respective optical scanning apparatuses cannot be avoided. The foregoing conventional technique is thus an impedimental to the reduction in size and cost of the multicolor image forming apparatus.

In order to solve the foregoing problems, a technique of simultaneously exposing the photosensitive drums to the respective laser beams for the respective colors which are outputted from a single optical scanning apparatus comprised of a single deflector, a single optical system and a single housing has been proposed.

However, since a relationship between a focal distance and a pitch of the photosensitive drums was undefined in this technique, the focal distance called for a redundant length for avoiding printing errors. Consequently, even such a technique has entailed the upsizing of the optical scanning apparatus and the increase in cost.

SUMMARY OF THE INVENTION

The present invention addresses the problems discussed above, and aims to provide an optical scanning apparatus capable of preventing color misregistration and realizing size reduction and cost reduction of the apparatus.

The optical scanning apparatus of the present invention comprises:

(a) a single deflector disposed in a direction perpendicular to a deflection plane for deflecting and scanning a plurality of bundled incident laser beams;

(b) a single conversion optical system disposed on optical paths of the laser beams scanned by the deflector for converting the bundle of laser beams moving at a constant angular velocity into a bundle of laser beams moving at a constant linear velocity;

(c) a plurality of reflection mirrors disposed on the optical paths of the respective laser beams emitted from the conversion optical system for separating the bundle of laser beams into laser beams corresponding to respective colors;

(d) a plurality of photosensitive members disposed at equal intervals for forming respective electrostatic latent images by means of the laser beams corresponding to the respective colors, wherein one of the photosensitive members is disposed on a plane parallel to an area defined by the laser beams traveling between the deflector and the conversion optical system; and (e) a correction optical system for correcting curvatures of field with respect to the respective laser beams and leading the laser beams to the photosensitive members, respectively, the correction optical system comprising correcting devices respectively disposed on the optical paths of the laser beams separated by the reflection mirrors.

This structure in which one of the photosensitive members is disposed on the above-described plane realizes the reduction in size and cost of the apparatus.

DETAILED DESCRIPTION OF THE INVENTION

Exemplary embodiments of the present invention are demonstrated hereinafter with reference to the accompanying drawings.

FIRST EXEMPLARY EMBODIMENT

Figure 1:
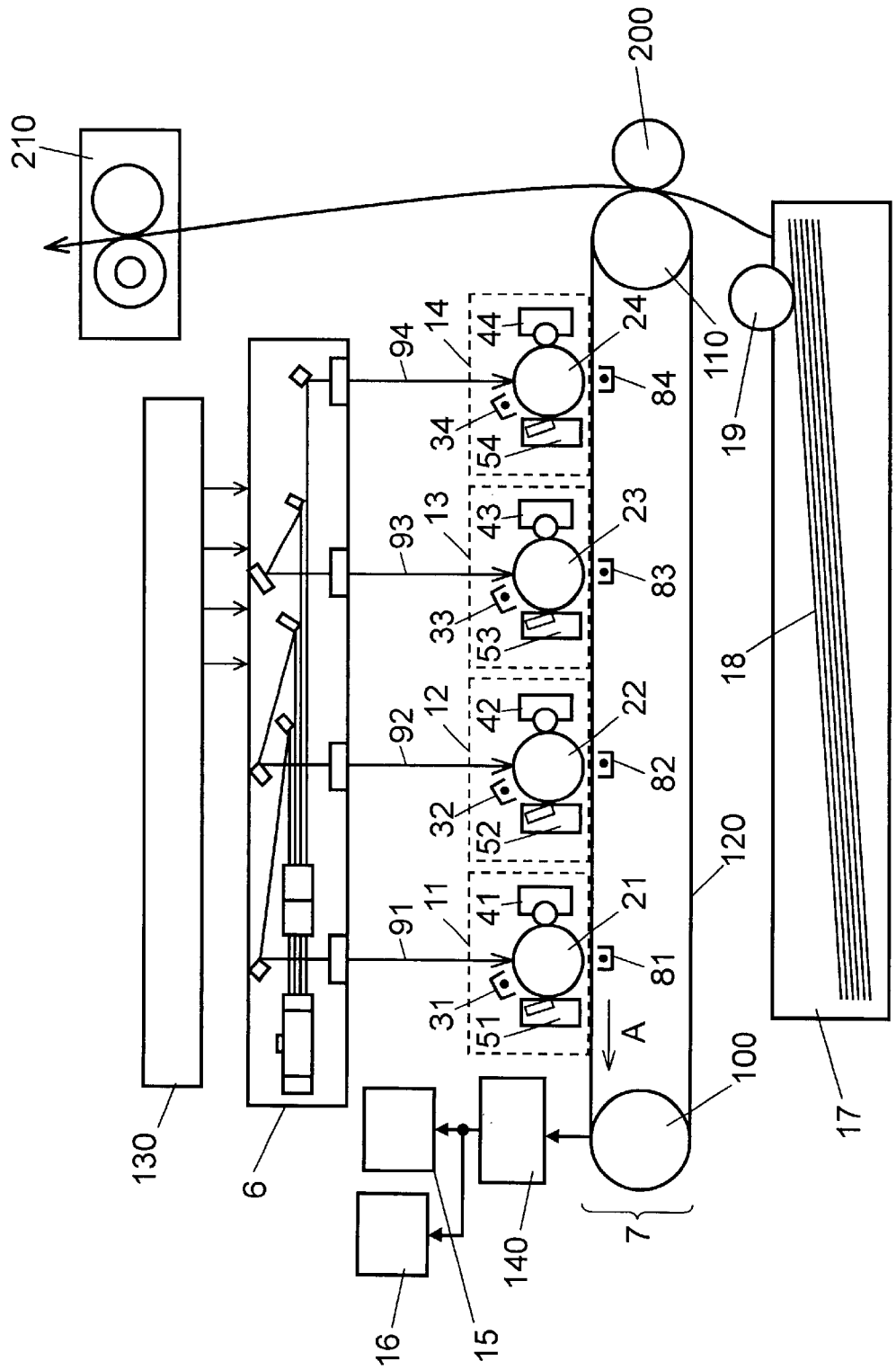
FIG. 1 is a diagram illustrating a multicolor image forming apparatus in which an optical scanning apparatus in accordance with an exemplary embodiment of the present invention is installed.
Figure 2:
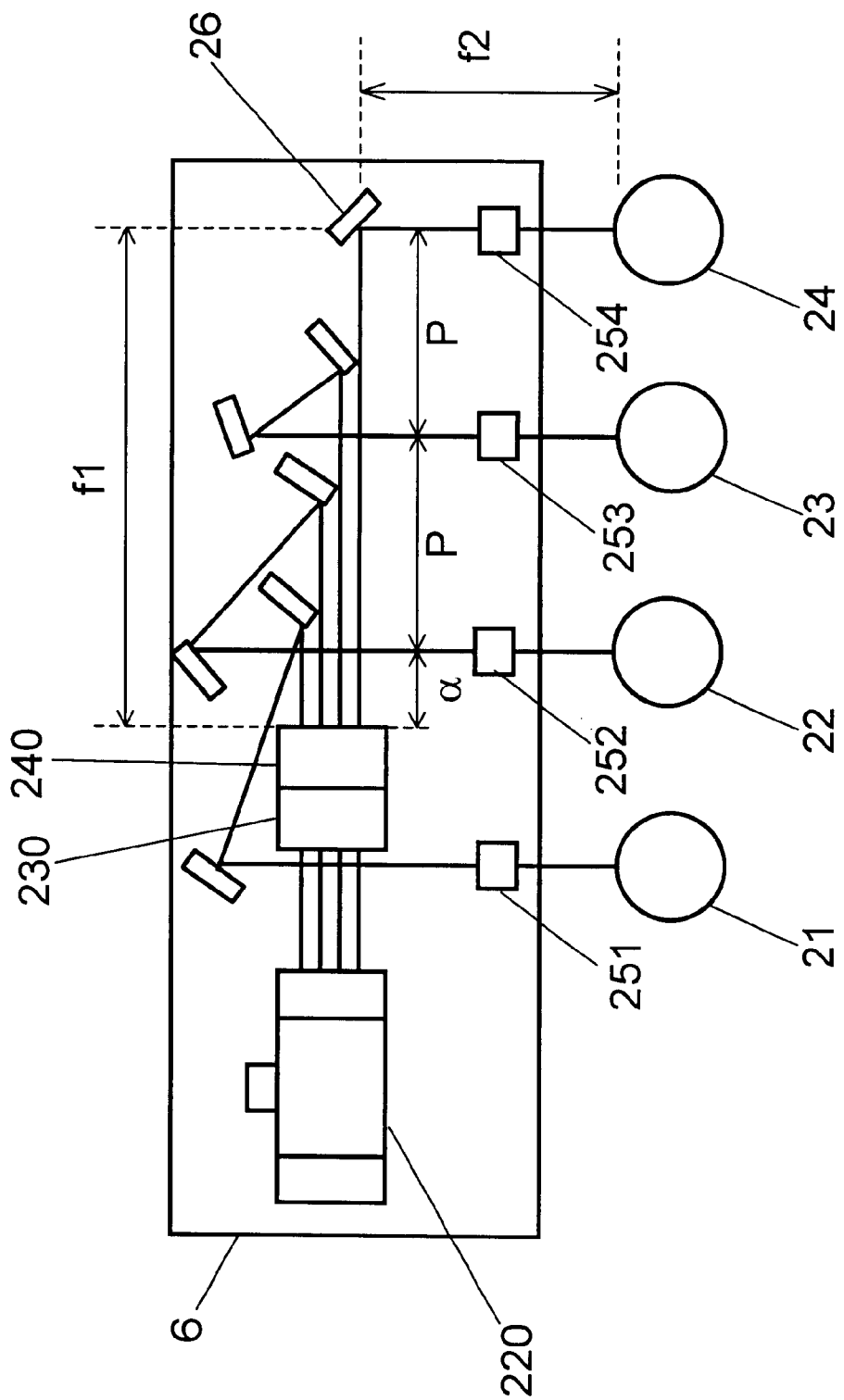
FIG. 2 is a diagram illustrating an optical scanning apparatus in accordance with a first exemplary embodiment of the present invention.
Figure 5:
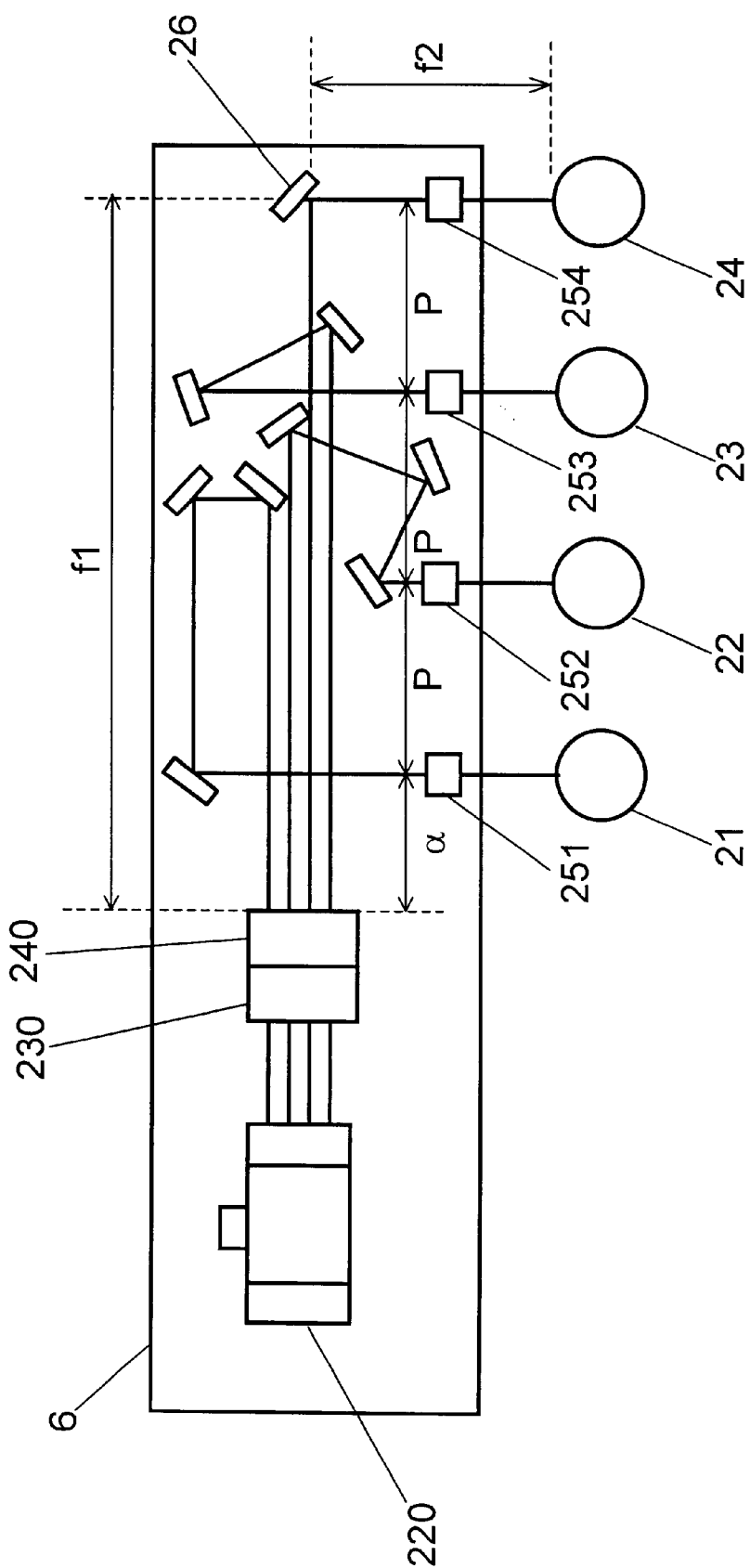
FIG. 5 is a diagram illustrating one example of an optical scanning apparatus studied by the present inventors.

FIG. 1 is a diagram illustrating a multicolor image forming apparatus in which an optical scanning apparatus in accordance with an exemplary embodiment of the present invention is installed, and FIG. 2 is a diagram illustrating an optical scanning apparatus in accordance with a first exemplary embodiment of the present invention. FIG. 5 is a diagram illustrating one example of an optical scanning apparatus studied by the present inventors. In FIG. 5, parts equivalent to those in accordance with the first exemplary embodiment have the same reference numerals as those shown in FIG. 2, and their explanations are omitted.

In FIG. 1, optical scanning apparatus 6 serving as an exposure unit for applying light corresponding to image information to each photosensitive drum and four image forming stations 11, 12, 13, 14 are disposed in the multicolor image forming apparatus. These stations 11, 12, 13, 14 have photosensitive drums (also referred to as "photosensitive members") 21, 22, 23, 24, respectively, which serve as image carriers. Chargers 31, 32, 33, 34 for uniformly charging the surfaces of the respective photosensitive drums, development units 41, 42, 43, 44 for visualizing electrostatic latent images, cleaners 51, 52, 53, 54 for removing residual toner, and transfer units 81, 82, 83, 84 for transferring toner images to an intermediate transfer belt (i.e., an image carrier) 120 constituting transfer mechanism 7 are disposed around the photosensitive drums, respectively.

Light beams for exposure 91, 92, 93, 94, which are scanned light beams corresponding to a yellow image, a magenta image, a cyan image and a black image, respectively, are outputted from optical scanning apparatus 6, and then inputted to stations 11, 12, 13, 14 which in turn form a yellow image, a magenta image, a cyan image and a black image, respectively.

Intermediate transfer belt 120 having no end is supported by rollers 100, 110, and disposed beneath drums 21, 22, 23, 24. Belt 120 rotates in a direction indicated by arrow "A" so as to pass stations 11, 12, 13, 14 in turn.

Toner density detector 140 for detecting toner density of each test pattern outputted from test pattern generator 130 is disposed so as to face belt 120. Furthermore, exposure intensity correcting unit 15 for correcting exposure power for each color based on a detected result of detector 140 and development bias correcting unit 16 for correcting a development bias value for each color based on the detected result of detector 140 are provided. It should be noted that optical scanning apparatus 6 outputs exposure intensity corrected by exposure intensity correcting unit 15, while development units 41, 42, 43, 44 output respective development biases corrected by development bias correcting unit 16.

Sheet 18 housed in paper feed cassette 17 is fed by feed roller 19, and discharged into an output tray (not shown) after passing through sheet transfer roller 200 and fixing unit 210.

An operation of the multicolor image forming apparatus as configured above is explained next.

At image forming station 14, a latent image for a black component (i.e., an image data) is formed on photosensitive drum 24 by a publicly known electrographic process using charger 34, optical scanning apparatus 6 and the like. Subsequently, the latent image is visualized as a black toner image by development unit 44 using a developing material containing black toner, and the black toner image is transferred to intermediate transfer belt 120 by transfer unit 84.

While the black toner image is transferred to belt 120, a latent image for a cyan component is formed at image forming station 13, and then visualized as a cyan toner image by development unit 43 using cyan toner. The cyan toner image is subsequently transferred by transfer unit 83 so as to lie on top of the black toner image, which is transferred to belt 120 earlier.

In the same manner as mentioned above, a magenta toner image and a yellow toner image are formed, and superposing of these four toner images on belt 120 terminates. Thereafter, sheet transfer roller 200 collectively transfers the toner images of four colors to sheet 18 such as paper or the like fed from paper feed cassette 17 by feed roller 19. Sheet 18 is then conveyed to fixing unit 210 by roller 200 to be subjected to heat-fixing, thereby obtaining a full-color image.

After the transfer is terminated, cleaners 51, 52, 53, 54 remove residual toner from respective drums 21, 22, 23, 24 for next image formation to be performed, thus completing a printing operation.

The optical scanning apparatus in accordance with the first exemplary embodiment of the present invention that is used in the multicolor image forming apparatus shown in FIG. 1 is further explained in detail with reference to FIG. 2.

In FIG. 2, optical scanning apparatus 6 is equipped with single deflector 220 consisting of, for example, a polygon mirror scanner motor. Deflector 220 is disposed in a direction perpendicular to a deflection plane, and receives a plurality of bundled incident laser beams (in the present embodiment, a bundle of four laser beams corresponding to four developing colors) to deflect and scan them. Four photosensitive drums 21, 22, 23, 24 corresponding to the four developing colors are disposed at equal intervals. On optical paths extending from deflector 220 to respective drums 21, 22, 23, 24, a single conversion optical system, a plurality of reflection mirrors 26 and a correction optical system are successively disposed. Here, the conversion optical system consists of first fθ lens 230 and second fθ lens 240 for converting the bundle of laser beams moving at a constant angular velocity into a bundle of laser beams moving at a constant linear velocity. Reflection mirrors 26 separate the bundle of four laser beams into four corresponding to respective colors. The correction optical system consists of third fθ lenses 251, 252, 253, 254 for correcting curvatures of field with respect to the respective laser beams thus separated. These single deflector 220, single conversion optical system, a plurality of reflection mirrors 26 and correction optical system are installed in a single housing.

One of these drums 21 through 24, that is, drum 21 is disposed on a plane parallel to an area defined by the laser beams traveling between deflector 220 and the conversion optical system. Some reflection mirrors 26 are so disposed that one of the separated laser beams passes along a side opposite to the side of lenses 230, 240 on which drum 21 is disposed, and then reaches drum 21 through a space between deflector 220 and lens 230. Drums 21, 22, 23, 24 are simultaneously exposed to the respective laser beams, thereby forming respective images.

When compared with the optical scanning apparatus shown in FIG. 5, the optical scanning apparatus as configured above is advantageous in the following aspect. Since drum 21 is disposed on the above-described plane, and one of the separated laser beams passes along a side opposite to the side of lenses 230, 240 on which drum 21 is provided, and then reaches drum 21 through a space between deflector 220 and lens 230, focal distance "F" can be short, whereby a spot diameter of each of the laser beams can be short, thereby realizing high image quality. Furthermore, lenses 230, 240 comprising the single conversion optical system can be reduced in size, thereby realizing cost reduction.

A specific explanation of the above aspect is given hereinafter.

Since the laser beams incident on lenses 230, 240 are parallel to each other, focal distance "F" from lens 240 to each of those drums 21, 22, 23, 24 is approximately f1+f2. Since the entire cost of optical system is mostly determined by focal distance "F", when this distance is short, light incident on the optical system necessary to reduce the spot diameters of the respective laser beams can be reduced in diameter, and small lenses at low cost can be obtained.

Assuming that a distance between the photosensitive drums, a distance between lens 240 and drum 22, which is the nearest drum to lens 240, and the number of photosensitive drums are "P", "α" and "n", respectively, distance "f1" is 2P+α in optical scanning apparatus 6 shown in FIG. 2. Moreover, since distance "f2" is limited by other mechanisms such as process means and the like provided around lenses 251, 252, 253, 254 and the photosensitive drums, it becomes approximately "P", a distance between the photosensitive drums. Consequently, focal distance "F" is expressed by F=f1+f2=3P+α. As opposed to this, in the optical scanning apparatus shown in FIG. 5, since distance "f1" is 3P+α, and distance f2≈P, focal distance "F" is expressed by F=4P+α.

As is clear from FIG. 2, since a distance from one of those reflection mirrors 26 to each of the photosensitive drums is required, setting F<2P+α is difficult. Consequently, focal distance "F" is expressed by 4P+α>F>2P+α. This expression applies to the case where the number of photosensitive drums "n" is 4; however, in general, n×P+α>F>(n−1)×P+α may be set. In addition, distance "α" can be rendered approximately zero depending on how lenses 230, 240 are disposed, so that focal distance "F" of lenses 230, 240 comprising the single conversion optical system can be set by the expression n×P>F≧(n−1)×P. Thus, this setting can provide excellent image quality and favorable cost.

SECOND EXEMPLARY EMBODIMENT

Figure 3:
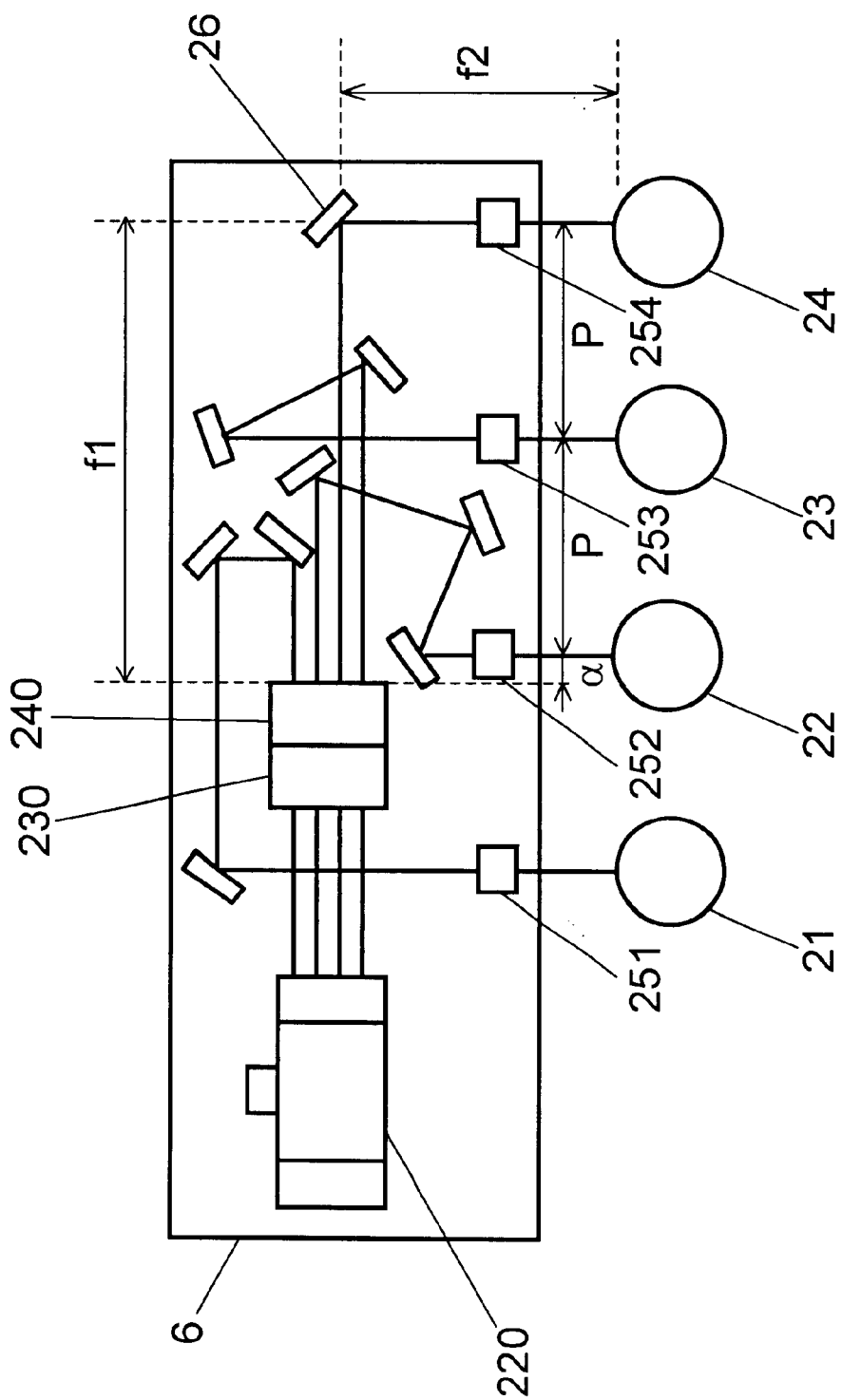
FIG. 3 is a diagram illustrating an optical scanning apparatus in accordance with a second exemplary embodiment of the present invention.

FIG. 3 is a diagram illustrating an optical scanning apparatus in accordance with a second exemplary embodiment of the present invention. A difference between the second exemplary embodiment and the first exemplary embodiment shown in FIG. 2 is in a way of disposing reflection mirrors 26. Even in the second exemplary embodiment, some reflection mirrors 26 are so disposed that one of the separated laser beams passes along a side opposite to the side of first fθ lens 230 and second fθ lens 240 on which drum 21 is disposed, and then reaches drum 21 through a space between deflector 220 and lens 230. Consequently, the same effects as those in the first exemplary embodiment can be ensured even in the second exemplary embodiment.

THIRD EXEMPLARY EMBODIMENT

Figure 4:
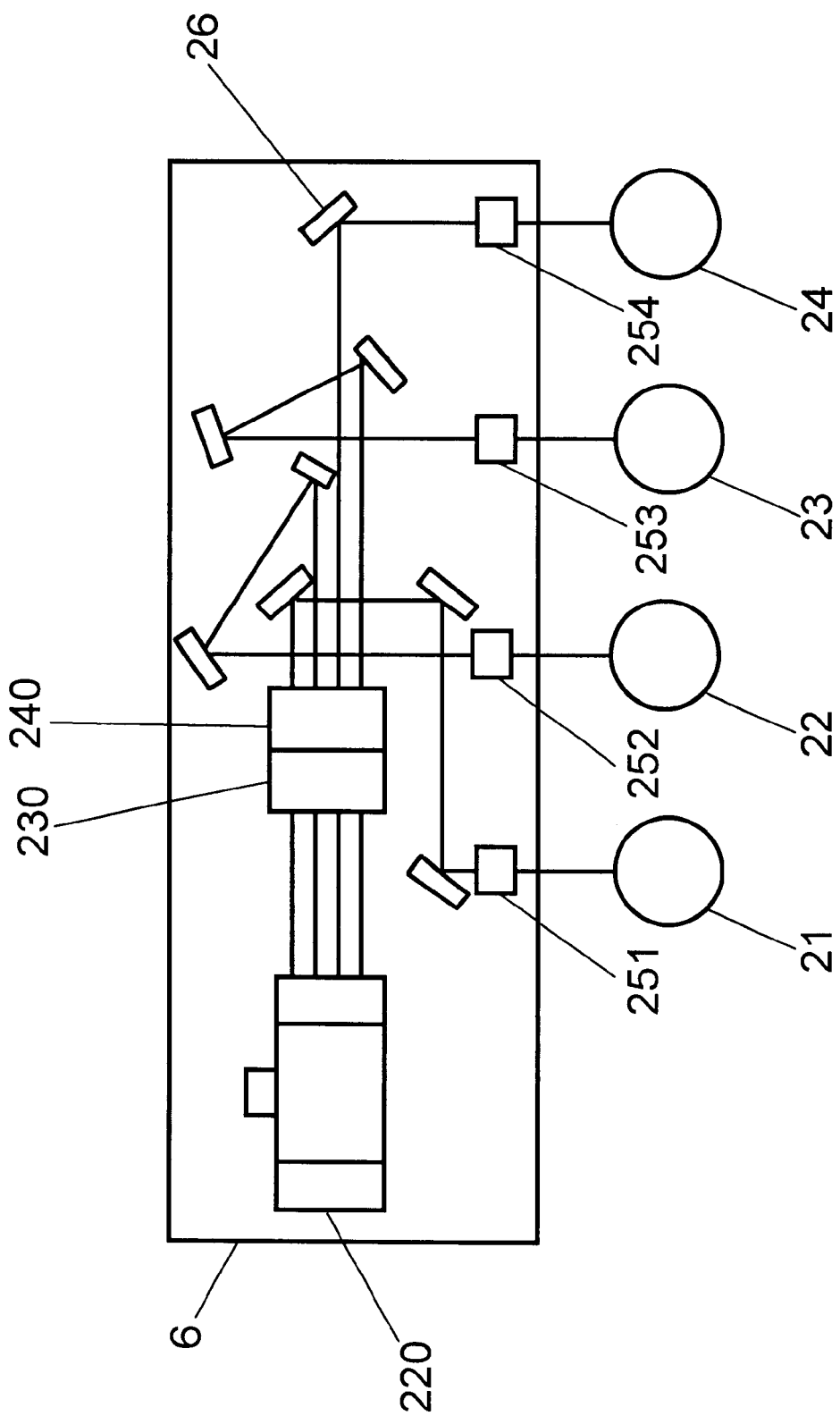
FIG. 4 is a diagram illustrating an optical scanning apparatus in accordance with a third exemplary embodiment of the present invention.

FIG. 4 is a diagram illustrating an optical scanning apparatus in accordance with a third exemplary embodiment of the present invention. The present embodiment differs from the first exemplary embodiment shown in FIG. 2 and the second exemplary embodiment shown in FIG. 3 in the following aspect. In the third exemplary embodiment, some reflection mirrors 26 allow one of the separated laser beams to pass through a space between the conversion optical system (i.e., first fθ lens 230 and second fθ lens 240) and photosensitive drum 22 and reach photosensitive drum 21. Even in the third exemplary embodiment, the same effects as those in the first and second exemplary embodiments can be ensured.

As described above, according to the present invention, since focal distance "F" is set by the expression n×P>F>(n× 2)×P, color misregistration can be prevented, while size and cost reduction can be attained.

What is claimed is:

1. An optical scanning apparatus comprising:
   (a) a single deflector disposed perpendicular with respect to a deflection plane for deflecting and scanning a plurality of bundled laser beams incident to the single reflector and traveling at a constant angular velocity;
   (b) a single conversion optical system disposed along the optical paths of the plurality of bundled laser beams scanned by the single deflector for converting the bundled laser beams into a plurality of bundled laser beams moving at a constant linear velocity;
   (c) a plurality of reflection mirrors disposed along the optical paths of each respective laser beam of the plurality of bundled laser beams emitted from the conversion optical system for separating the plurality of bundled laser beams into laser beams corresponding to respective colors, at least one of the laser beams separated by the plurality of reflection mirrors passing through a space between the single deflector and the conversion optical system;
   (d) a plurality of photosensitive members disposed at equal intervals for forming respective electrostatic latent images by means of the laser beams corresponding to the respective colors, wherein one of the photosensitive members is disposed on a plane which is parallel with respect to an area defined by the laser beams traveling between the single deflector and the conversion optical system; and
   (e) a correction optical system for correcting curvatures away from a desired optical path with respect to each respective laser beam and directing each respective laser beam along the desired optical path to a corresponding photosensitive member, the correction optical system having correcting devices respectively disposed along the desired optical paths of each laser beam separated by the plurality of reflection mirrors.

2. An optical scanning apparatus comprising:
(a) a single deflector disposed perpendicular with respect to a deflection plane for deflecting and scanning a plurality of bundled laser beams incident to the single reflector and traveling at a constant angular velocity;
(b) a single conversion optical system disposed along the optical paths of the plurality of bundled laser beams scanned by the single deflector for converting the bundled laser beams into a plurality of bundled laser beams moving at a constant linear velocity;
(c) a plurality of reflection mirrors disposed along the optical paths of each respective laser beam emitted from the conversion optical system for separating the plurality of bundled laser beams into laser beams corresponding to respective colors;
(d) a plurality of photosensitive members disposed at equal intervals for forming respective electrostatic latent images by means of the laser beams corresponding to the respective colors, wherein one of the photosensitive members is disposed on a plane which is parallel with respect to an area defined by the laser beams traveling between the single deflector and the conversion optical system, at least one of the laser beams being separated by the plurality of reflection mirrors passing along an opposite side to the conversion-optical-system-side on which the photosensitive members are provided prior to passage through the space between the single deflector and the conversion optical system, for application to the corresponding photosensitive member; and
(e) a correction optical system for correcting curvatures away from a desired optical path with respect to each respective laser beam and directing each respective laser beam along the desired optical path to a corresponding photosensitive member, the correction optical system having correcting devices respectively disposed along the desired optical paths of each laser beam separated by the plurality of reflection mirrors.

3. An optical scanning apparatus comprising:
(a) a single deflector disposed in a direction perpendicular to a deflection plane for deflecting and scanning a plurality of bundled incident laser beams;
(b) a single conversion optical system disposed on optical paths of the laser beams scanned by the deflector for converting the bundle of laser beams moving at a constant angular velocity into a bundle of laser beams moving at a constant linear velocity;
(c) a plurality of reflection mirrors disposed on the optical paths of the respective laser beams emitted from the conversion optical system for separating the bundled laser beams into laser beams corresponding to respective colors;
(d) a plurality of photosensitive members disposed at equal intervals for forming respective electrostatic latent images by means of the laser beams corresponding to the respective colors, wherein one of the photosensitive members is disposed on a plane parallel to an area defined by the laser beams traveling between the deflector and the conversion optical system; and
(e) a correction optical system for correcting curvatures of field with respect to the respective laser beams and leading the laser beams to the photosensitive members, respectively, the correction optical system comprising correcting devices respectively disposed on the optical paths of the laser beams separated by the reflection mirrors;

wherein a distance between the photosensitive members, the number of photosensitive members and a focal distance of the conversion optical system are P, n and F, respectively, $n \times P > F \geq (n-1) \times P$.

* * * * *